(12) United States Patent
Inoue et al.

(10) Patent No.: US 9,718,389 B2
(45) Date of Patent: Aug. 1, 2017

(54) CONTAINER HOLDER

(71) Applicants: HONDA MOTOR CO., LTD., Minato-ku, Tokyo (JP); NIFCO INC., Kanagawa (JP)

(72) Inventors: Kei Inoue, Wako (JP); Kozo Kobayashi, Wako (JP); Masamitsu Shiono, Wako (JP); Taku Hirama, Yokosuka (JP)

(73) Assignees: HONDA MOTOR CO., LTD., Tokyo (JP); NIFCO INC., Kanagawa (JP)

( * ) Notice: Subject to any disclaimer, the term of this patent is extended or adjusted under 35 U.S.C. 154(b) by 0 days.

(21) Appl. No.: 15/032,134

(22) PCT Filed: Oct. 16, 2014

(86) PCT No.: PCT/JP2014/005253
§ 371 (c)(1),
(2) Date: Apr. 26, 2016

(87) PCT Pub. No.: WO2015/064039
PCT Pub. Date: May 7, 2015

(65) Prior Publication Data
US 2016/0304020 A1 Oct. 20, 2016

(30) Foreign Application Priority Data
Oct. 28, 2013 (JP) ................................. 2013-223120

(51) Int. Cl.
*B60R 7/00* (2006.01)
*B60N 3/10* (2006.01)

(52) U.S. Cl.
CPC .................... *B60N 3/106* (2013.01)

(58) Field of Classification Search
CPC ....................................................... B60N 3/106
See application file for complete search history.

(56) References Cited

U.S. PATENT DOCUMENTS

| 4,712,823 A | * | 12/1987 | Mills | ........................ | B60N 3/18 |
| | | | | | 296/152 |
| 5,706,686 A | * | 1/1998 | Babbitt | .................. | B21D 51/26 |
| | | | | | 72/117 |

FOREIGN PATENT DOCUMENTS

| JP | H0920166 A | 1/1997 |
| JP | 2005047438 A | 2/2005 |
| JP | 2008143294 A | 6/2008 |

(Continued)

OTHER PUBLICATIONS

International Search Report of International Application No. PCT/JP2014/005253, Dec. 22, 2014, 6 pages.

*Primary Examiner* — Lori L Lyjak
(74) *Attorney, Agent, or Firm* — Armstrong Teasdale LLP (57) ABSTRACT

Provided is a container holder (1, 70) comprising a body member (3) defining a recess (2) with a bottom, a roller (5) supported by the body member such that at least a part of the roller projects into the recess to engage a container (60) received in the recess, and a biasing member (6) for urging the roller into the recess, wherein the roller is supported by the body member in such a manner that a rotational center line (B) of the roller extends in a tangential direction of a circle centered around a central axial line (A) of the recess, and the roller is enabled to slide in a radial direction of the recess and to tilt around an axial line in parallel with the central axial line.

7 Claims, 9 Drawing Sheets

(56) References Cited

FOREIGN PATENT DOCUMENTS

| JP | 2008195159 A | 8/2008 |
|----|--------------|--------|
| JP | 2008230570 A | 10/2008 |
| JP | 5121436 B2 | 1/2013 |

\* cited by examiner

CONTAINER HOLDER

TECHNICAL FIELD

The present invention relates to a container holder for retaining a beverage container.

BACKGROUND ART

Container holders configured to be incorporated in the instrument panel of a vehicle are known. A container holder typically includes a receiving recess with a bottom for receiving a container therein and a support member provided in a side wall of the recess to retain containers of various sizes in a stable manner. For instance, it is known to provide a support member in the side wall of the recess so as to be moveable in the radial direction and urge the support member toward the side of the recess with a biasing member such as a compression coil spring. See Patent Document 1, for instance. In such a container holder, even when the container is relatively small so that a gap is created between the recess and the container if no measure is taken, the container may be firmly held in the recess without rattling by urging the support member into the recess under the spring force of a biasing member, and pushing the support member against the container. In the case of the container holder disclosed in Patent Document 1, the support member is provided with a freely rotatable roller that is configured to be brought into contact with the container. Thereby, the friction between the support member and the container when inserting and removing the container into and out of the container holder is minimized, and the insertion and removal of the container is facilitated. However, when the support member is simply pushed onto a side of the container as is the case with the invention of Patent Document 1, the magnitude of the frictional force between the support member and the container is so limited that the rotation of the container in the recess cannot be prevented in a satisfactory manner. If the container is effectively prevented from rotating in the recess, the user is enabled to screw and unscrew the cap of the container without requiring the user to hold the container itself.

To support a container in the recess in a rotationally fast manner, the container holder disclosed in Patent Document 2 includes a bottom plate provided in the recess in a vertically moveable manner, a spring urging the bottom plate upwardly and a plurality of pressure pieces provided along the outer periphery of the bottom plate in a rotatable manner. In this container holder, when the bottom plate is pushed down by a container, the pressure pieces moving downward with the bottom plate come into contact with projections provided on the side wall of the recess, and are thereby caused to tilt toward the center. The container is thereby interposed between the pressure pieces that have tilted toward the center so that the container is supported in the recess in a rotationally fast manner.

PRIOR ART DOCUMENT(S)

Patent Document(s)

Patent Document 1: JP5121436B
Patent Document 2: JP2005-47438A

SUMMARY OF THE INVENTION

Task to be Accomplished by the Invention

However, the container holder disclosed in Patent Document 2 has the drawback that the range of the size of the container that can be held in a stable manner is quite limited. Also, in order to secure the container in a rotationally fast manner, the user has to forcibly push the container into the recess. The frictional force that is produced by the pressure pieces depends on how deep the container is pushed into the bottom of the recess, and the container is required to be relatively forcibly pushed into the recess in order to produce an adequate frictional force.

The present invention was made in view of such a problem of the prior art, and has a primary object to provide a container holder that can hold containers of a wide range of size in a stable manner, and can effectively prevent the rotation of the container held in the container holder.

Means to Accomplish the Task

To achieve such an object, the present invention provides a container holder (1, 70), comprising: a body member (3) defining a recess (2) with a bottom; a roller (5) supported by the body member such that at least a part of the roller projects into the recess to engage a container (60) received in the recess; and a biasing member (6) for urging the roller into the recess; wherein the roller is supported by the body member in such a manner that a rotational center line (B) of the roller extends in a substantially tangential direction of a circle centered around a central axial line (A) of the recess, and the roller is enabled to slide in a radial direction of the recess and to tilt within a prescribed range around an axial line in parallel with the central axial line.

According to this arrangement, when a rotative force centered around the central axial line A is applied to the container, the container under this rotative force causes the roller to tilt owing to the entraining action of the container on the roller with the result that the contact pressure between the roller and the container increases. This increases the frictional force acting between the container and the roller to such an extent that the container is held rotationally fast to the recess. When the container is held rotationally fast to the recess, the cap of the container can be screwed and unscrewed without requiring for the user to hold the container itself.

In this invention, the roller preferably includes a shaft member (26) and an outer shell member (27) surrounding the shaft member, the outer shell member having a higher flexibility and a higher frictional coefficient than the shaft member.

Thereby, the frictional force acting between the container and the roller is increased, and the rotation of the container can be prevented in an even more effective manner.

In this invention, preferably, each axial end of the shaft member is supported by a guide slot (21) formed in the body member, and the biasing member includes a pair of biasing members urging either axial end of the shaft member.

According this arrangement, when a rotative force is applied to the container, and the roller tilts about an axial line in parallel with the central axial line, the tilting motion of the roller is promoted, and the frictional force acting between the container and the roller is increased even further.

In this invention, it may be arranged such that a slider (4) is received in each guide slot so as to be slidable along a length of the guide slot and to be tiltable within a prescribed range around an axial line in parallel with the central axial line, and the two axial ends of the shaft member are rotatably supported by the respective sliders, the biasing members urging the two axial ends of the shaft member via the respective sliders.

According to this arrangement, the tilting motion of the roller may be accommodated by an engagement between the guide slot and the slider.

In this invention, a gap may be created between the shaft member and the outer shell member so that the outer shell member is deformable toward the shaft member when the roller engages the container.

Owing to the deformation of the outer shell member, the roller is enabled to contact the container in an intimate manner so that the frictional force acting between the container and the roller is increased.

In this invention, the roller may be provided with a smaller outer diameter in an axially middle part of the roller than in either axial end of the roller.

According to this arrangement, the roller can be more closely brought into contact with the container so that the frictional force acting between the container and the roller is increased.

In this invention, preferably, the outer shell member is provided with a tubular configuration, and the shaft member is formed by combining a plurality of component parts.

According to this arrangement, the roller may be provided with a smaller outer diameter in an axially middle part of the roller than in either axial end of the roller without complicating the process of assembling the outer shell member and the shaft member.

Effect of the Invention

According to such an arrangement of a container holder, containers of a wide range of size can be retained in a stable manner, and the rotation of the container can be effectively prevented.

BRIEF DESCRIPTION OF THE INVENTION

DETAILED DESCRIPTION OF THE PREFERRED EMBODIMENT(S)

Preferred embodiments of the present invention in the form of a container holder incorporated in a center console of a motor vehicle are described in the following with reference to the append drawings. Various directions with respect to the illustrated container holder are defined as shown in the various drawings.

First Embodiment

Figure 1:
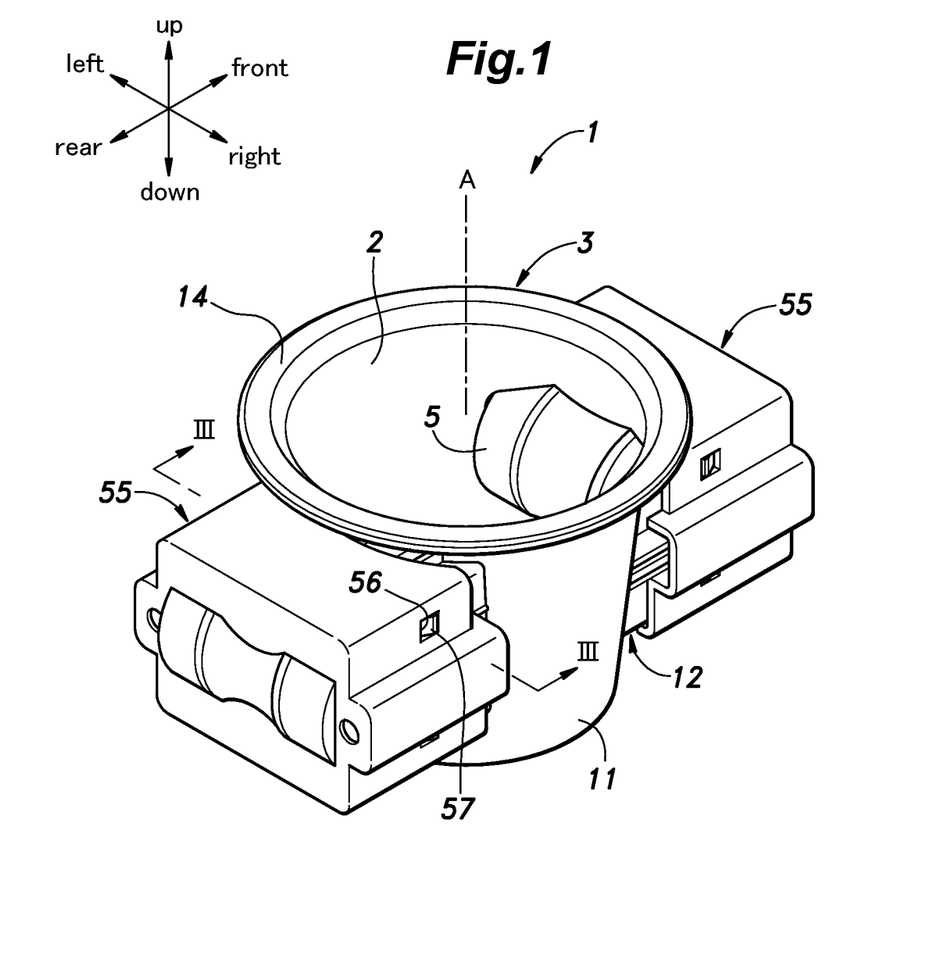
FIG. 1 is a perspective view of a container holder given as a first embodiment.
Figure 2:
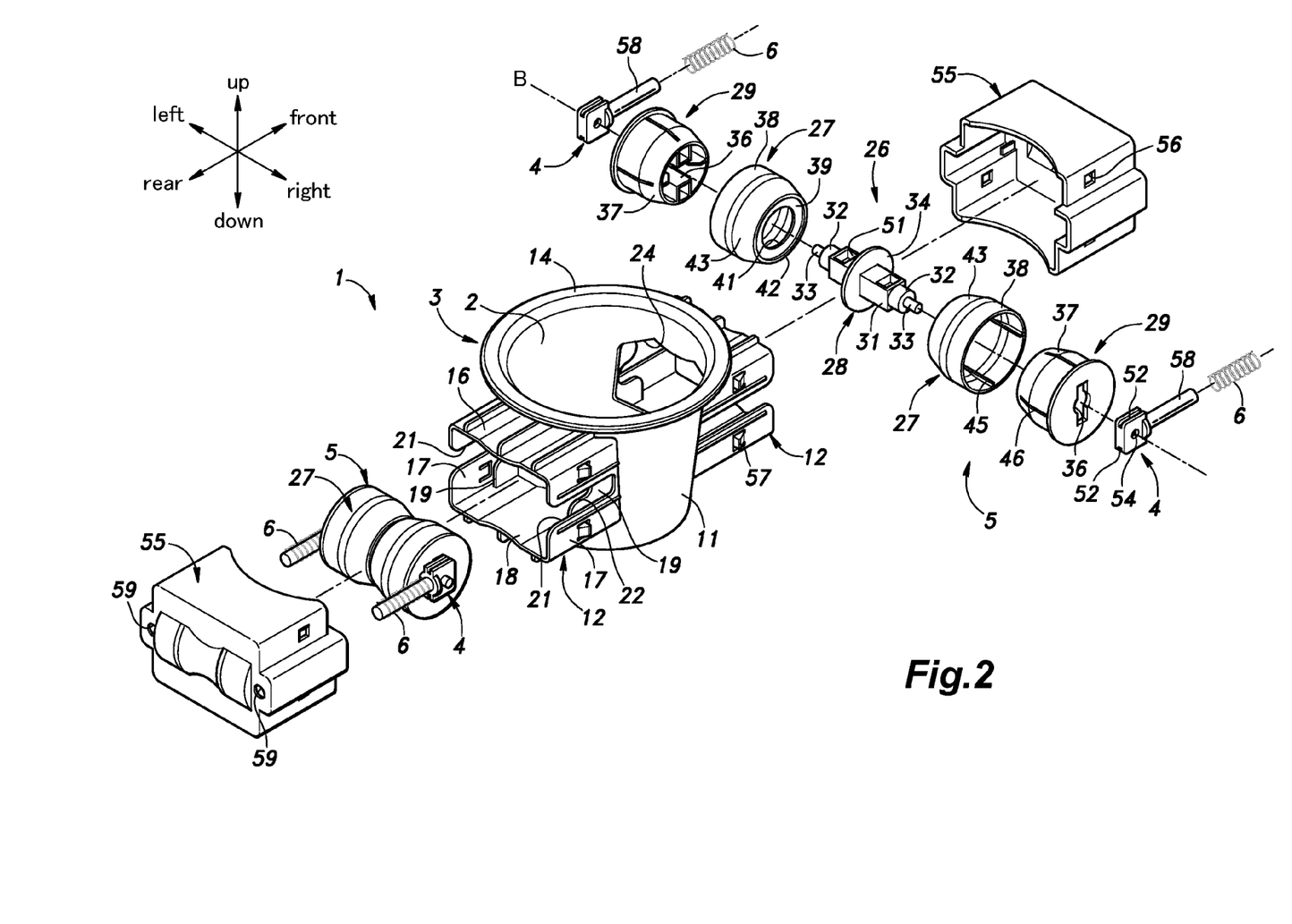
FIG. 2 is an exploded perspective view of the container holder of the first embodiment.

As shown in FIGS. 1 and 2, the container holder 1 is provided with a body member 3 defining a recess 2, a plurality of sliders 4 slidably supported by the body member 3, a pair of rollers 5 each supported by the body member 3 via two of the sliders 4 and a spring 6 provided for each slider 4 for urging the corresponding roller 5. The body member 3 is provided with a main body 11 having the shape of a cylinder with a closed bottom end and a pair of roller support portions 12 projecting outward from either side of the main body 11. The recess 2 extends in the direction of a central axial line A, and is provided with a bottom surface 13 at one end thereof extending perpendicularly to the central axial line A (FIG. 5) and an open end at the other end thereof. The recess 2 is provided with a circular cross section centered around the central axial line A, and a cylindrical side wall. In the illustrated embodiment, the container holder 1 is installed in such a manner that the central axial line A of the recess 2 extends vertically, and the bottom surface 13 is positioned at the lower end thereof. The upper end of the main body 11 or the open end of the recess 2 is defined by an annular radial flange 14.

The two roller support portions 12 are located on the front side and the rear side of the main body 11, respective, in a mutually symmetric manner about the central axial line A, and are also shaped in a mutually symmetric manner. The rear roller support portion 12 is described in the following as representing the two roller support portions 12 of the container holder 1 because the front and rear roller support portions 12 are essentially identical to each other. The rear roller support portion 12 is provided with an upper wall 16, a pair of side walls 17 and a lower wall 18, and is generally shaped as a rectangular tube extending in the fore and aft direction. The roller support portion 12 is attached to the outer side of the main body 11 at the front ends of the upper wall 16, the side walls 17 and the lower wall 18. The rear end of the roller support portion 12 opens out toward the rear. In other words, the upper wall 16, the side walls 17 and the lower wall 18 forming the roller support portion 12 project rearwardly from the outer side of the main body 11. The two side walls 17 extend substantially vertically. The upper wall 16, the side walls 17 and the lower wall 18 are provided with ribs extending in the fore and aft direction for reinforcement purpose.

A pair of auxiliary walls 19 each extending from the upper wall 16 to the lower wall 18 are provided slightly inward of the respective side walls 17. The front edge of each auxiliary wall 19 is connected to the outer side of the main body 11. Each auxiliary wall 19 is shorter than the corresponding side wall 17 as measured in the fore and aft direction so that the rear edge of the auxiliary wall 19 is located ahead of the rear edge of the corresponding side wall 17.

Each side wall 17 is formed with a guide slot 21 extending in the fore and aft direction. The guide slot 21 is passed through the entire thickness of the corresponding side wall 17, and has a rear end that opens out at the rear edge of the side wall 17. The front end of the guide slot 21 is closed at a point short of the front edge of the side wall 17. Similarly, each auxiliary wall 19 is formed with an auxiliary guide slot 22 extending in the fore and aft direction. The auxiliary guide slot 22 is passed through the thickness of the corresponding auxiliary wall 19, and has a rear end that opens out at the rear edge of the auxiliary wall 19. The auxiliary guide slot 22 is vertically aligned with the corresponding guide slot 21. The front end of the auxiliary guide slot 22 is closed at a point short of the front edge of the auxiliary wall 19, and substantially aligns with the front end of the guide slot 21 with respect to the fore and aft direction. The description of the front roller support portion 12 is omitted here because the two roller support portions 12 are symmetric to each other.

The side part of the main body 11 corresponding to each roller support portion 12 is provided with an insertion opening 24 which is passed through the thickness of the side wall of the main body 11. Each insertion opening 24 is thus formed in a region surrounded by the upper wall 16, the side walls 17 and the lower wall 18 of the corresponding roller support portion 12, and is given with a substantially rectangular shape having a relatively large width in comparison to the height thereof.

Each roller support portion 12 supports a roller 5. As the two rollers 5 of the respective roller support portions 12 are identical in structure, only one of the rollers 5 may be described in some part of the following description. Each roller 5 includes a shaft member 26 and a pair of tubular outer shell members 27 surrounding the shaft member 26. The shaft member 26 includes a first shaft member 28 defining the rotational center line B of the roller 5 and a pair of second shaft members 29 fitted onto the outer circumferential surface of the first shaft member 28.

The first shaft member 28 includes a rectangular shaft portion 31 having a rectangular cross section and positioned axially centrally of the first shaft member 28, a pair of large diameter shaft portions 32 projecting from either axial end of the rectangular shaft portion 31 and a pair of small diameter shaft portions 33 each projecting from the outer axial end of the corresponding large diameter shaft portion 32. The large diameter shaft portions 32 and the small diameter shaft portions 33 are each provided with a circular cross section. The rectangular shaft portion 31, the two large diameter shaft portions 32 and the two small diameter shaft portions 33 are disposed coaxially to one another, and jointly define the rotational center line B of the roller 5.

The outer diameter of the large diameter shaft portions 32 is smaller than the length of any of the sides of the rectangular shaft portion 31, and is greater than the outer diameter of the small diameter shaft portions 33. The rectangular shaft portion 31 is centrally (or in a lengthwise middle point of the shaft member 26) provided with a disk-shaped radial flange 34 extending perpendicularly to the rotational center line B.

Each second shaft member 29 is columnar in shape, and is centrally provided with a first through hole 36 for passing the rectangular shaft portion 31 thereinto in a complementary manner. Each second shaft member 29 is provided with an inner tapered portion 37 having a progressively decreasing outer diameter toward the inner axial end thereof and a constant diameter portion in an outer axial end part thereof.

Each second shaft member 29 is fitted into a corresponding outer shell member 27. The outer shell member 27 includes a tubular part 38 and a bottom plate part 39 provided at an axial end of the tubular part 38. The bottom plate part 39 is formed with a second through hole 41 configured to receive the corresponding rectangular shaft portion 31. The bottom plate part 39 is provided with an annular axial flange 42 extending axially along the outer periphery of the bottom plate part 39. The tubular part 38 is provided with an outer tapered portion 43 having an outer diameter and an inner diameter that progressively decrease toward the bottom plate part 39. The axial end part of the tubular part 38 facing away from the bottom plate part 39 has a constant outer diameter and a constant inner diameter.

Each second shaft member 29 is fitted into the corresponding outer shell member 27 in such a manner that the outer tapered portion 43 and the inner tapered portion 37 oppose each other. Because the inner diameter of the outer shell member 27 is greater than the outer diameter of the second shaft member 29, a certain gap is created between the inner surface of the outer shell member 27 and the outer surface of the second shaft member 29 when these two components are fitted one into the other. The inner surface of the outer shell member 27 is provided with a plurality of radial ribs 45 projecting radially inward, and the free end of each radial rib 45 is fitted into a corresponding engagement groove 46 provided in the second shaft member 29 so that the relative rotation between the second shaft member 29 and the outer shell member 27 is prevented. The radial ribs 45 also maintain the annular gap between the second shaft member 29 and the outer shell member 27 in the prescribed configuration.

Once the outer shell member 27 is fitted on the second shaft member 29, the corresponding end of the first shaft member 28 is passed into the second through hole 41 of the outer shell member 27 and the first through hole 36 of the second shaft member 29. When the first shaft member 28 is fully passed into the second through hole 41, the large diameter shaft portion 32 and the small diameter shaft portions 33 project from the second shaft member 29 while the rectangular shaft portion 31 is engaged by the first through hole 36 so that the first shaft member 28 and the second shaft member 29 are held rotationally fast to each other, and jointly rotatable about the common rotational center line B. An engagement claw (not shown in the drawings) is provided in a part of the second shaft member 29 located in the first through hole 36, and a corresponding engagement recess 51 is provided in the rectangular shaft portion 31 for engaging the engagement claw so that the second shaft member 29 is prevented from being axially coming off from the first shaft member 28.

When the first shaft member 28 and the two second shaft members 29 are assembled together, the tapered parts are located in the middle part of the corresponding roller 5 with respect to the axial direction, and the bottom plate part 39 of each outer shell member 27 is interposed between the flange 34 and the corresponding second shaft member 29. At this time, the annular axial flange 42 of each outer shell member 27 is located radially outwardly of the flange 34, and the projecting edge of the annular axial flange 42 abuts the corresponding part of the opposing outer shell member 27. As a result, the flange 34 is enclosed by the bottom plate parts 39 and the annular axial flanges 42 of the outer shell members 27.

Each outer shell member 27 is made of material having a higher flexibility and a higher frictional coefficient than the material of the shaft member 26 which includes the first shaft member 28 and the second shaft members 29. Each outer shell member 27 may be made of thermoplastic elastomer such as olefin elastomer and styrene elastomer. The shaft member 26 may be made of plastic material such as polycarbonate, ABS and polyacetal. The outer circumferential surface of the outer shell member 27 may be textured or roughened so that a higher frictional coefficient may be achieved.

Each roller 5 prepared in this manner is provided with a smaller outer diameter in the axially central part thereof about the rotational center line B. As the outer peripheral part of the roller 5 is formed by the outer shell members 27 having a higher flexibility and a higher frictional resistance, a relatively large frictional force may be created between the roller 5 and the container 60. In particular, because there is a gap between the shaft member 26 and the outer shell members 27, the roller 5 is enabled to come into a close contact with the container 60 owing to the deflection of the outer shell members 27 toward the gap.

Figure 3:
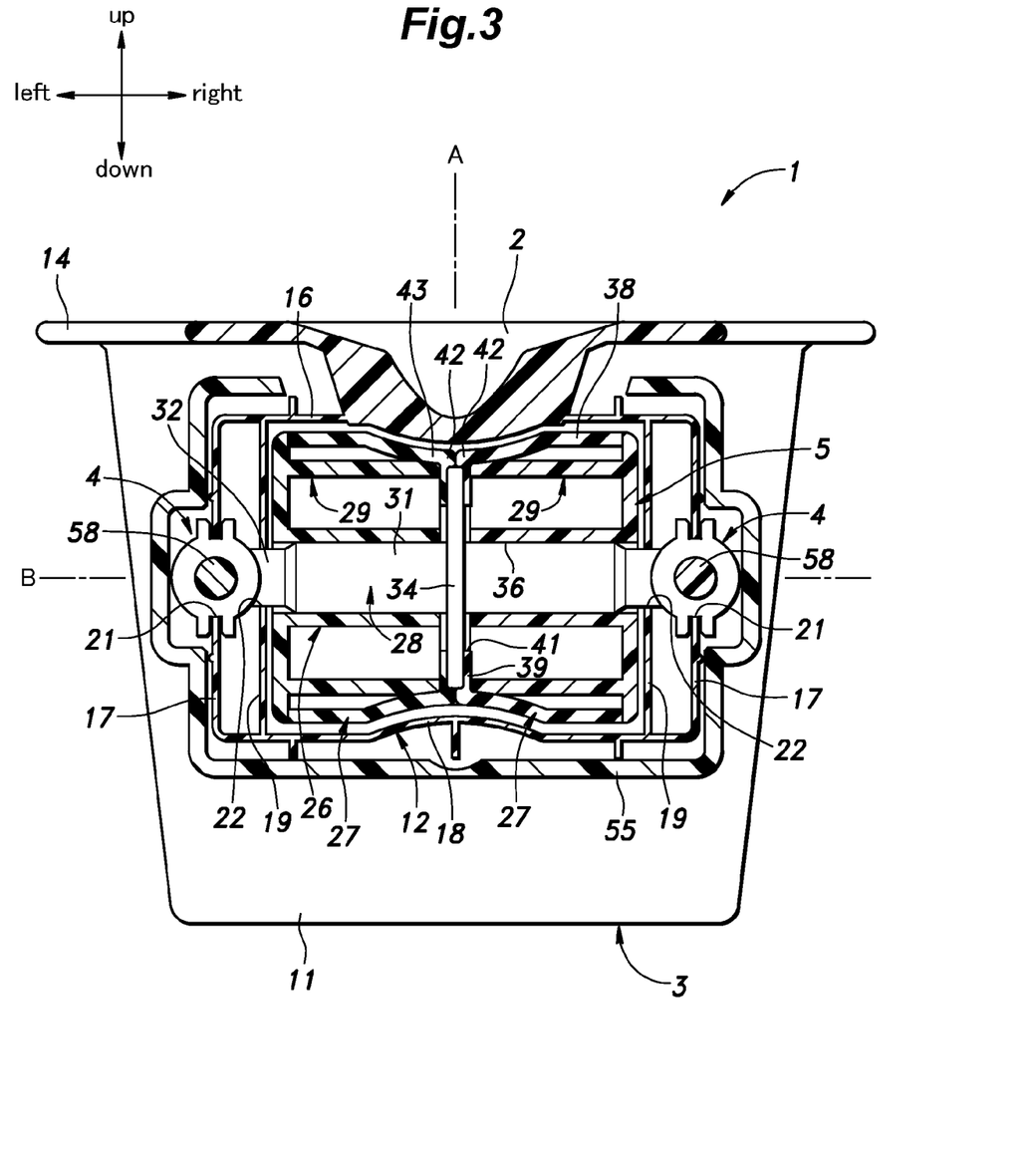
FIG. 3 is a sectional view taken along line of FIG. 1.
Figure 4:
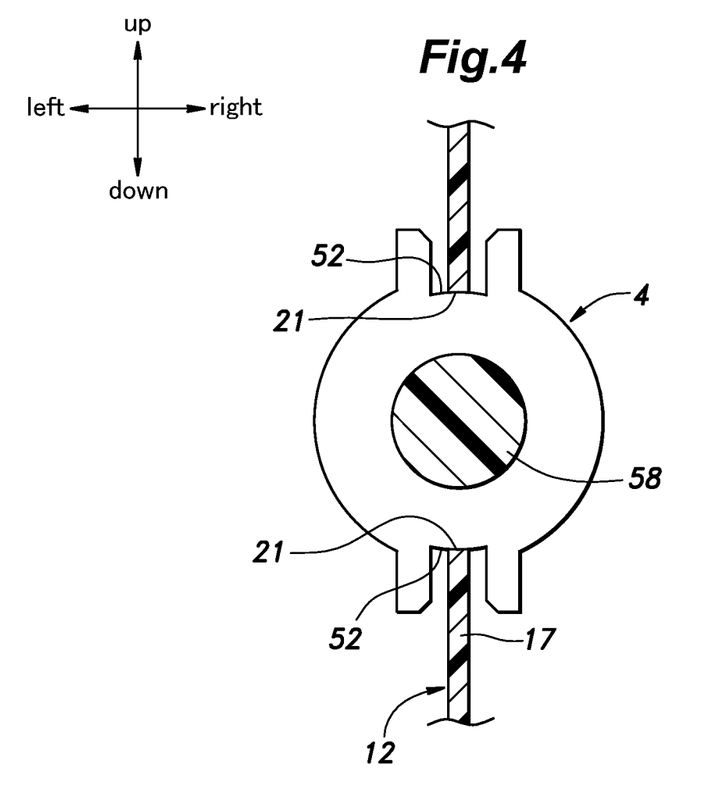
FIG. 4 is an enlarged view of a part of FIG. 3 (showing an engagement structure between the slider and the guide hole)

As shown in FIGS. 3 and 4, each roller 5 is supported by the corresponding roller support portion 12, via the two sliders 4, at the small diameter shaft portions 33 thereof, respectively, on either axial end of the roller 5 having the rotational center line B. Each slider 4 is provided with an engagement groove 52 extending in the fore and aft direction on the upper and lower ends thereof. The upper engagement groove 52 is engaged by the upper edge of the guide slot 21, and the lower engagement groove 52 is engaged by the lower edge of the guide slot 21 so that the slider 4 is supported by the side wall 17 so as to be slidable in the fore and aft direction within the guide slot 21. Thus, the upper edge and the lower edge of each guide slot 21 serve as guide rails for guiding the corresponding slider 4. The width of the upper and lower engagement grooves 52 is somewhat greater than the thickness (lateral dimension) of the side wall 17. As a result, the upper edge and the lower edge of the guide slot 21 are allowed to tilt within the respective engagement grooves 52 so that the slider 4 is enabled to tilt in the lateral direction within a prescribed range about an axial line (vertical axial line) extending in parallel with the central axial line A.

As shown in FIGS. 1 and 2, each slider 4 is provided with a bearing hole 54 passed laterally through the slider 4 to rotatably support the corresponding small diameter shaft portion 33 of the roller 5. The inner diameter of the bearing hole 54 is smaller than the outer diameter of the large diameter shaft portion 32 so that the large diameter shaft portion 32 is prevented from moving into the bearing hole 54. After the small diameter shaft portions 33 of the roller 5 are fitted into the respective bearing holes 54 of the sliders 4, the sliders 4 are inserted into the respective guide slots 21, so that the roller 5 is supported by the roller support portion 12. With the roller 5 supported by the corresponding roller support portion 12 via the sliders 4, a cover 55 is attached to the roller support portion 12. The cover 55 is essentially box-shaped, and defines an inner chamber that receives the upper wall 16, the two side walls 17 and the lower wall 18 of the corresponding roller support portion 12 therein. The cover 55 thus closes the open end of the roller support portion 12. Engagement holes 56 formed in the cover 55 are engaged by elastic claws 57 provided on the side walls 17 so that the cover 55 is fixedly secured to the roller support portion 12. Once the cover 55 is attached to the roller support portion 12, the open rear end of the guide slot 21 is closed by the cover 55 so that the sliders 4 are prevented from moving out of the respective guide slots 21.

A cylindrical spring support shaft 58 projects from the end of each slider 4 facing away from the recess 2 (rearward in the case of the sliders 4 supported by the rear roller support portion 12). The cover 55 is formed with through holes 59 for passing the respective spring support shafts 58 therethrough. Each through hole 59 is provided with an inner diameter greater than the outer diameter of the corresponding spring support shaft 58 so that the through hole 59 does not prevent the motion of the spring support shaft 58 even when the slider 4 is caused to tilt in the lateral direction with respect to the vertical axial line.

Figure 5:
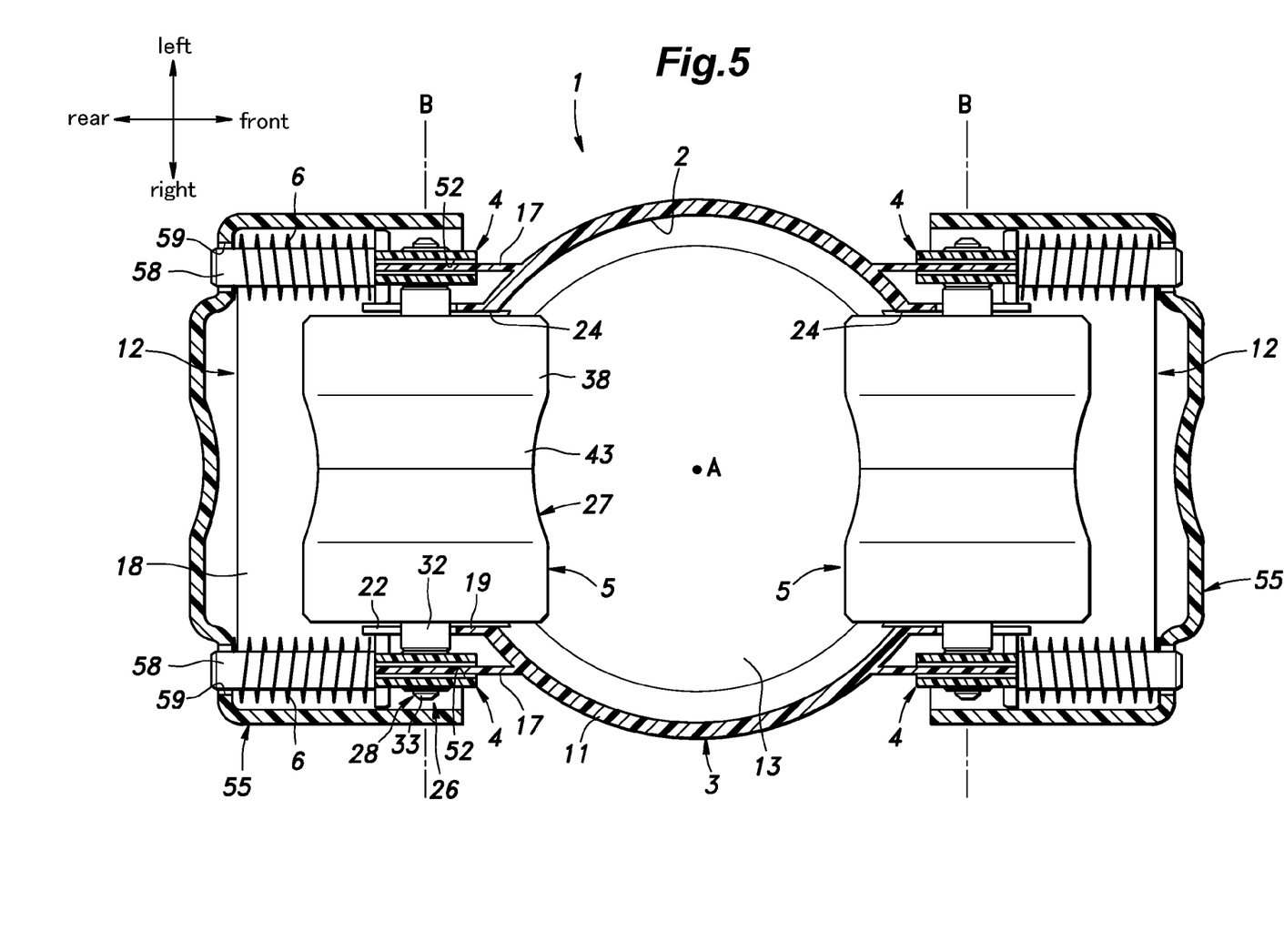
FIG. 5 is a sectional view showing the container holder of the first embodiment in the initial condition.

As shown in FIGS. 1, 2 and 5, each spring support shaft 58 supports a spring 6 consisting of a compression coil spring. The spring support shaft 58 is passed centrally through the spring 6 which is engaged by the slider 4 at one end thereof and by the cover 55 at the other end thereof. Therefore, the slider 4 is urged toward the recess 2 in the guide slot 21. When no container 60 is held in the recess 2, the sliders 4 abut the ends of the guide slots 21 adjacent to the recess 2 under the spring force of the springs 6 so that a part of the roller 5 projects into the recess 2 via the insertion opening 24. This state is referred to as "the initial condition". In the initial condition, the rotational center line B of the roller 5 extends in the tangential direction of a circle centered around the central axial line A. In the illustrated embodiment, the central axial line A extends vertically while the rotational center line B extends laterally.

The container holder 1 is typically installed in a center console (not shown in the drawings) of an instrument panel (not shown in the drawings) of a motor vehicle. In such a case, an opening is formed in the center console, and the container holder 1 may be positioned such that the flange 14 of the body member 3 abuts the front side of the periphery of the opening. Preferably, the roller support portions 12 and the covers 55 are located on the back side of the center console so that these parts are not visible from the outside.

The mode of operation and advantages of the container holder 1 of the first embodiment are discussed in the following. The container 60 that is to be retained by the container holder 1 may consist of a per se know plastic bottle having a screw cap, a metallic can or a paper cup.

Figure 6:
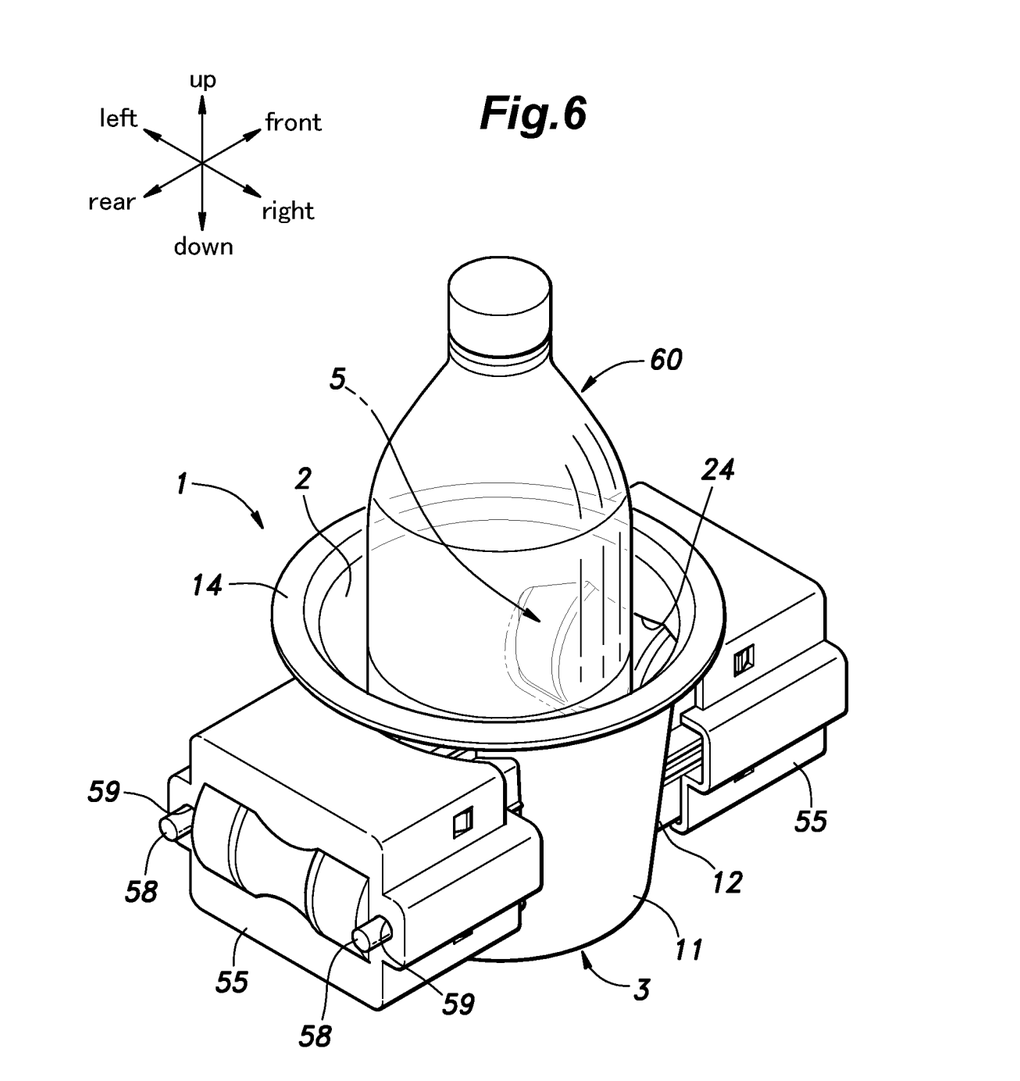
FIG. 6 is a perspective view showing the container holder of the first embodiment with a container held therein.
Figure 7:
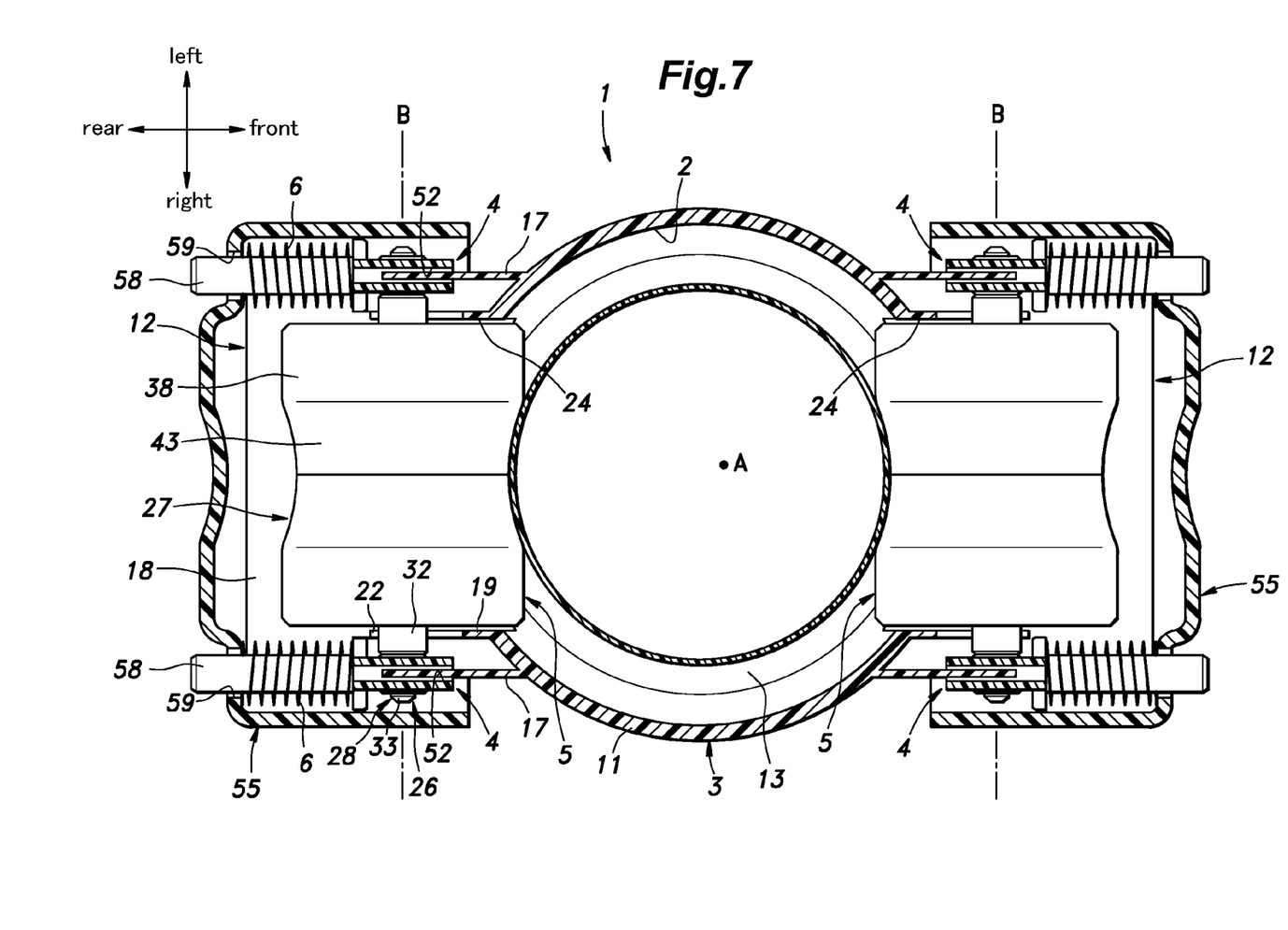
FIG. 7 is a sectional view showing the container holder of the first embodiment with a container held therein.

When the container 60 is introduced into the recess 2, the bottom and the side of the container 60 are initially engaged by the outer circumferential surface of the rollers 5 projecting into the recess 2. When the container 60 is pushed further into the recess 2, the rollers 5 receive a frictional force from the container 60 that causes the rollers 5 to rotate around the respective rotational center lines B, and are pushed aside in a radially outward direction against the biasing force of the springs 6 as shown in FIG. 6. In other words, the two rollers 5 are moved away from each other so that a space for accommodating the container 60 is created between the two rollers 5. The radially outward travels of the rollers 5 depend on the size of the container 60. In other words, the two rollers 5 can interpose containers of a wide range of size between them in an appropriate manner. Therefore, without regard to the size, the container 60 can be clamped between the rollers 5 in a stable manner, and can be held stationary in the recess 2 in a stable manner.

When removing the container 60 from the recess 2, the container 60 may be pulled out from between the rollers 5 under the spring force of the springs 6. As the container 60 is pulled out in the direction of the central axial line A, the frictional force produced between the container 60 and the rollers 5 cause the rollers 5 to rotate, and once the container 60 is completely pulled out, the rollers 5 project into the recess 2 under the spring force of the springs 6, or return to the initial condition (See FIG. 5).

Because the rollers 5 rotate as the container 60 is pushed into and pulled out of the recess 2, the frictional resistance between the container 60 and the rollers 5 is minimized so that the inserting and removing the container 60 into and out of the recess 2 is facilitated.

The middle part of each roller 5 with respect to the rotational center line is provided with a smaller outer diameter that the axially end parts of the roller 5 so that the area of contact with the container 60 having a cylindrical shape can be maximized. Each roller 5 is provided with the outer shell members 27 on the outer circumferential surface thereof which are more deformable (flexible) than the shaft member 26 and directly engage the container 60 so that the contact area with the container 60 can be maximized. Also, the outer shell members 27 have a higher frictional coefficient than the shaft member 26 so that the frictional force acting between the roller 5 and the container 60 is increased.

In particular, a gap is created between the outer shell members 27 and the second shaft member 29 so that the outer shell members 27 are allowed to deflect toward the gap. As a result, the outer shell members 27 are enabled to deform in conformity to the shape of the container 60, and to come into a close contact with the container 60 with a maximum contact area. Because the rollers 5 provide a large frictional force to the container 60 as discussed above, the container 60 can be retained with a high level of stability.

Figure 8:
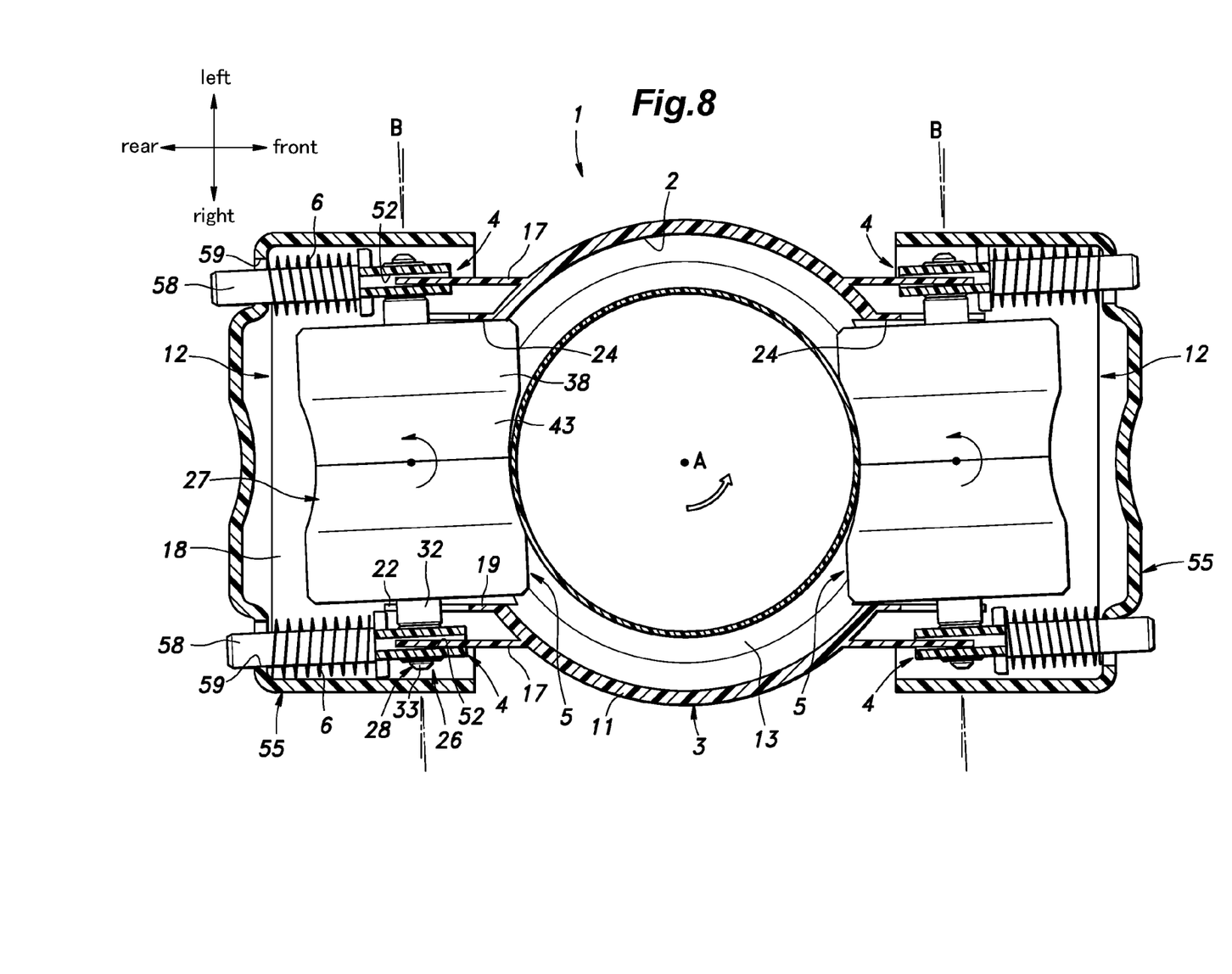
FIG. 8 is a sectional view showing the container holder of the first embodiment when a rotational force is applied to the container.

Because the upper edge and lower edge of the guide slot 21 of each side wall 17 engage the corresponding parts of the engagement grooves 52, respectively, with a certain amount of play, each slider 4 is enabled to tilt with respect to the corresponding side wall 17 about an axial line parallel to the central axial line A. Therefore, when a rotative force is applied to the container 60 received in the recess 2 about the central axial line A, the frictional force acting between the outer circumferential surface of the container 60 and the rollers 5 applies a moment or a torque to each roller 5 about an axial line parallel to the central axial line A. This moment cause the rollers 5 to tilt against the spring force of the springs 6 individually applied to the two ends of the shaft members 26 of the rollers 5. The tilting of the rollers 5 in the direction of the rotation of the container 60 increases the contact pressure between the rollers 5 and the container 60, and hence increases the frictional force between the rollers 5 and the container 60. This effectively prevents the rotation of the container 60.

When the rotational center line B of each roller 5 has tilted about an axial line parallel to the central axial line A to a significant extent, the relative angle between each slider 4 and the adjoining part of the side wall 17 changes in such a manner that a significant frictional force is produced between the engagement groove 52 of the slider 4 and the upper and lower edges of the corresponding guide slot 21. Thereby, the radially outward movement of the rollers 5 is prevented so that when a rotatively force is applied to the container 60, the contact between the rollers 5 and the container 60 is maintained, and an adequate frictional force is produced between the two parts.

Because the rollers 5 are positioned in diametrically opposed positions about the central axial line A so as to be enabled to hold the container 60 in a stable manner, when a rotative force is applied to the container 60, the two rollers 5 tilt in such a manner that the container 60 is more forcibly clamped between the rollers 5 and a frictional force between the rollers 5 and the container 60 is increased.

As discussed above, the container holder 1 prevents the container 60 from rotating when a rotative force centered around the central axial line A is applied to the received container 60 by exerting a frictional force to the container 60 via the rollers 5. Therefore, the user of the container holder 1 can remove the screw cap located at the top end of the container 60 which is retained in the recess 2 simply by turning the screw cap without requiring the container 60 itself to be held with a hand. In other words, the user is enabled to open the container 60 retained in the container holder 1 with a single hand.

Second Embodiment

Figure 9:
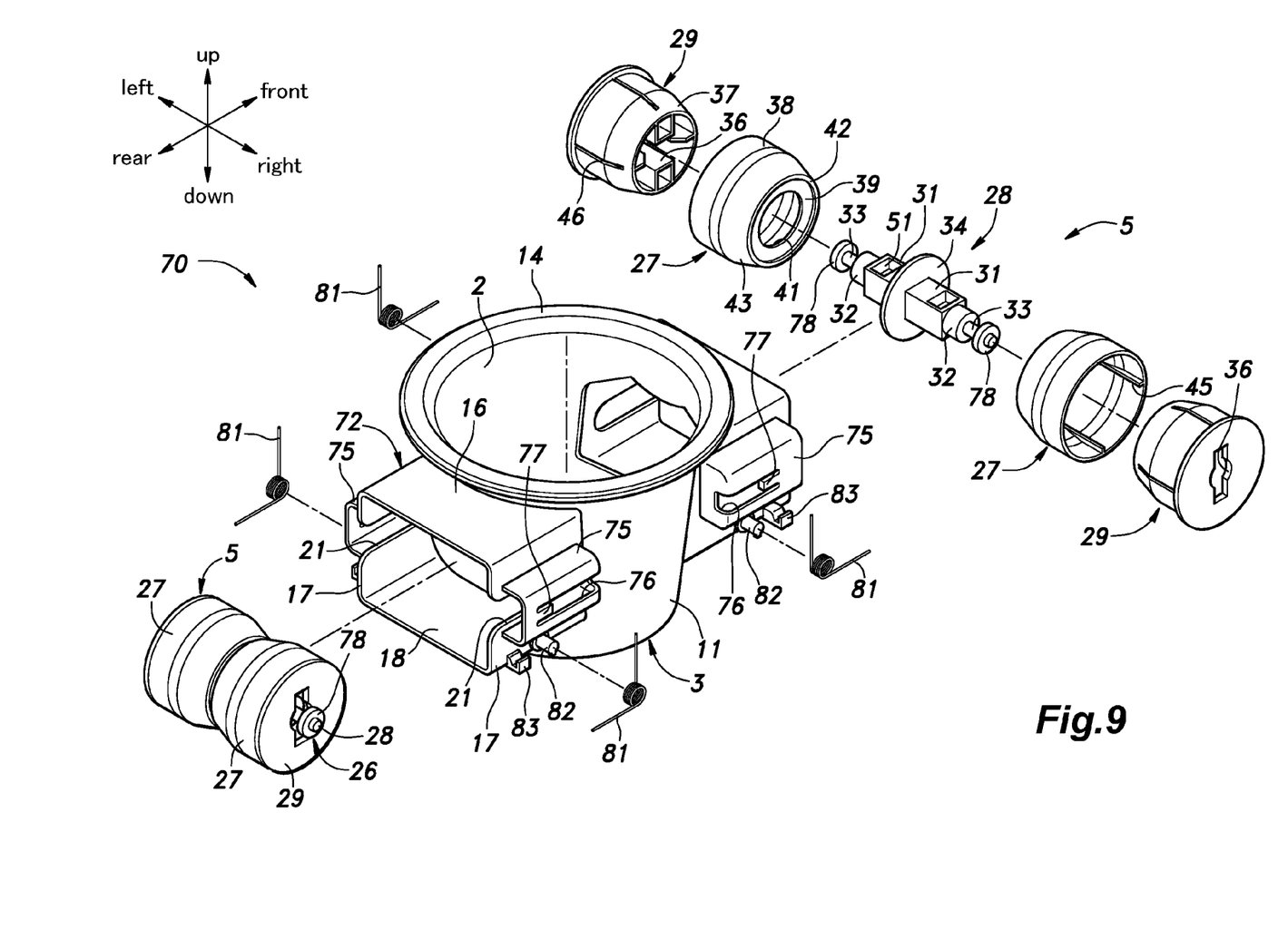
FIG. 9 is an exploded perspective view of a container holder of a second embodiment.

The container holder 70 of the second embodiment differs from the container holder 1 of the first embodiment in that the sliders 4 are omitted, and the shaft member 26 of each roller 5 is directly supported by the guide slots 21. In the description of the container holder 70 of the second embodiment, parts corresponding to those of the container holder 1 of the first embodiment are denoted with like numerals without necessarily repeating the description of such parts.

As shown in FIG. 9, in the container holder 70 of the second embodiment, each of the roller support portions 72 formed in the body member 3 is provided with the shape of a rectangular pipe extending in the fore and aft direction, and includes an upper wall 16, a pair of side walls 17 and a lower wall 18. No auxiliary walls are formed between the two side walls 17. Each side wall 17 is formed with a guide slot 21. An external auxiliary wall 75 is provided on the exterior of each side wall 17 in such a manner that the external auxiliary wall 75 bridges over the corresponding guide slot 21. The external auxiliary wall 75 is channel-shaped (provided with a rectangular C-shaped cross section), and includes an upper wall, a side wall and a lower wall in such a manner that a space is created between the corresponding side wall 17 and the external auxiliary wall 75. The side wall of the external auxiliary wall 75 is formed with an engagement slot 76 extending in the fore and aft direction, and an end of the engagement slot 76 facing away from the engagement slot 76 is provided with an elastic claw 77.

The small diameter shaft portions 33 of each roller 5 are provided with engagement portions 78 in the form of radially outwardly extending disks, respectively. The outer diameter of each engagement portion 78 is equal to or smaller than the outer diameter of the large diameter shaft portions 32. Each engagement portion 78 is slightly spaced away from the free end of the corresponding small diameter shaft portion 33.

Each roller 5 is supported by the body member 3 in a slidable manner in the fore and aft direction and in a tiltable manner about an axial line in parallel with the central axial line A by the large diameter shaft portions 32 provided on either axial end of the shaft member 26 being supported by the respective guide slots 21. When installing each roller 5 into the corresponding roller support portion 72 of the body member 3 or when inserting the large diameter shaft portions 32 into the respective guide slots 21, the two ends of the small diameter shaft portions 33 engage and deform the respective elastic claws 77. When the roller 5 is fully installed into the corresponding roller support portion 72, the two ends of the small diameter shaft portions 33 pass through the respective elastic claws 77, and the elastic claws 77 return to their original configurations. Once the elastic claws 77 have returned to their original configurations, the elastic claws 77 prevent the passage of the respective small diameter shaft portions 33 so that the roller 5 is permanently retained by the corresponding roller support portion 72. In other words, the position of each roller 5 most remote from the recess 2 is determined by the abutting of the small diameter shaft portions 33 onto the respective elastic claws 77.

A spring support shaft 82 projects from each side wall 17, and a coil part of a spring 81 consisting of a torsion coil spring is fitted onto the spring support shaft 82. An end of the spring 81 is passed through a hole formed in the lower wall of the corresponding external auxiliary wall 75, and is engaged by a part of the small diameter shaft portion 33 located between the large diameter shaft portion 32 and the engagement portion 78. The other end of the spring 81 is engaged by a spring engagement portion 83 projecting from the outer surface of the corresponding side wall 17. Thereby, the shaft member 26 of each roller 5 is urged toward the recess 2 by the springs 81 individually acting on the respective outer ends of the shaft member 26 of the roller 5. In the initial condition where no container 60 is held in the recess 2, the rollers 5 are in the positions most proximate to the recess 2 owing to the large diameter shaft portions 32 abutting the ends of the respective guide slots 21. In this initial condition, the rotational center line B of each roller 5 extends in the tangential direction of a circle centered around the central axial line A.

The container holder 70 of the second embodiment provides advantages similar to those of the container holder 1 of the first embodiment. Because of the absence of the sliders 4 and the spring support shafts 58, the container holder 70 of the second embodiment is free from the problem of the spring support shafts 58 projecting outward as the rollers 5 move away from the recess 2. Therefore, the container holder 70 may be accommodated in a more limited space than the container holder 1 of the first embodiment.

The present invention has been described in terms of specific embodiments, but is not limited by such embodiments, and can be modified and substituted in a number of different ways without departing from the spirit of the present invention. A pair of rollers 5 were arranged at an angular interval of 180 degrees about the central axial line A in the foregoing embodiments, but three rollers 5 may also be arranged at an angular interval of 120 degrees about the central axial line A or four rollers 5 may be arranged at an angular interval of 90 degrees. It may also be possible to use only one roller 5 so that the container 60 may be interposed between the roller 5 and the opposing side wall of the recess 2.

Glossary of Terms 1, 70 container holder
2 recess
3 body member
4 slider
5 roller
6, 81 spring (biasing member)
21 guide slot
24 insertion opening
26 shaft member
27 outer shell member
28 first shaft member
29 second shaft member
52 engagement groove
54 bearing hole
55 cover
60 container
81 spring (biasing member)

A central axial line
B rotational center line

The invention claimed is:

1. A container holder, comprising:
   a body member defining a recess with a bottom;
   a roller supported by the body member such that at least a part of the roller projects into the recess to engage a container received in the recess; and
   a biasing member for urging the roller into the recess;
   wherein the roller is supported by the body member in such a manner that a rotational center line of the roller extends in a substantially tangential direction of a circle centered around a central axial line of the recess, and the roller is enabled to slide in a radial direction of the recess and to tilt within a prescribed range around an axial line in parallel with the central axial line.

2. The container holder according to claim 1, wherein the roller includes a shaft member and an outer shell member surrounding the shaft member, the outer shell member having a higher flexibility and a higher frictional coefficient than the shaft member.

3. The container holder according to claim 2, wherein each axial end of the shaft member is supported by a guide slot formed in the body member, and the biasing member includes a pair of biasing members urging either axial end of the shaft member.

4. The container holder according to claim 3, wherein a slider is received in each guide slot so as to be slidable along a length of the guide slot and to be tiltable within a prescribed range around an axial line in parallel with the central axial line, and the two axial ends of the shaft member are rotatably supported by the respective sliders, the biasing members urging the two axial ends of the shaft member via the respective sliders.

5. The container holder according to claim 2, wherein a gap is created between the shaft member and the outer shell member so that the outer shell member is deformable toward the shaft member when the roller engages the container.

6. The container holder according to claim 2, wherein the roller is provided with a smaller outer diameter in an axially middle part of the roller than in either axial end of the roller.

7. The container holder according to claim 6, wherein the outer shell member is provided with a tubular configuration, and the shaft member is formed by combining a plurality of component parts.

\* \* \* \* \*